Feb. 18, 1964 B. MICHAELS 3,121,543

REEL SPINDLE

Filed Sept. 15, 1961 2 Sheets-Sheet 1

Inventor:
Bruno Michaels
By Robert H. Michaels Atty.

Feb. 18, 1964 B. MICHAELS 3,121,543

REEL SPINDLE

Filed Sept. 15, 1961 2 Sheets-Sheet 2

Inventor:
Bruno Michaels
By Robert F. Michaels Atty.

United States Patent Office 3,121,543
Patented Feb. 18, 1964

3,121,543

REEL SPINDLE

Bruno Michaels, Chicago, Ill., assignor to Bell & Howell Company, Chicago, Ill., a corporation of Illinois Filed Sept. 15, 1961, Ser. No. 138,512
5 Claims. (Cl. 242—68.1)

This invention relates to a spindle mount for a reel of the type usually employed in motion picture projectors although the mount is equally useable with other types of reels such as those used on tape recorders.

On motion picture projectors, the feed and take-up reel spindles are commonly driven through a slipping clutch arrangement. This slippage, plus the close fit usually present between a reel and the reel spindle, combine to prevent one from engaging the spindle key with a slot in the reel unless the key and slot are aligned or unless the spindle is held with one hand while the other hand turns the reel. The problem is even more troublesome where the spindle cannot be held while placing the reel thereon as in a tape recorder.

One object of the invention is the provision of a spindle mount having a key which will automatically seat itself in a corresponding keyway or slot in a reel without the necessity of the operator lining up the key on the spindle with the keyway on the reel.

Another object of the invention is concerned with a spindle having a key which will become engaged with a keyway in a reel pressed thereagainst regardless of the initial relationship of the two members.

Another object of the invention is the provision of a spindle mount which will only accept a film reel in locking engagement when the reel is placed on the spindle, slotted side first.

For a more complete understanding of the nature and scope of this invention, reference can be had to the following description taken together with the accompanying drawings in which.

Figure 1:
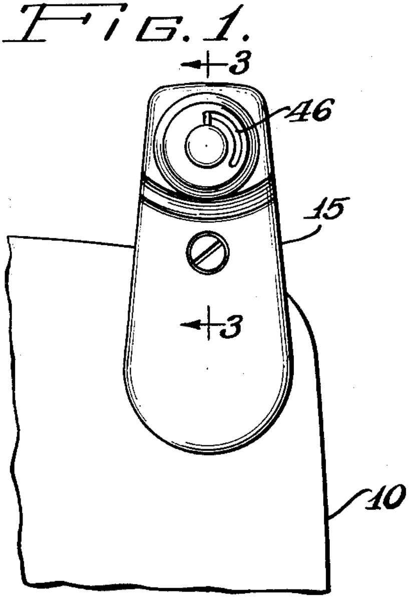
FIG. 1 is an end view of a reel arm incorporating the features of the present invention.
Figures 3, 4:
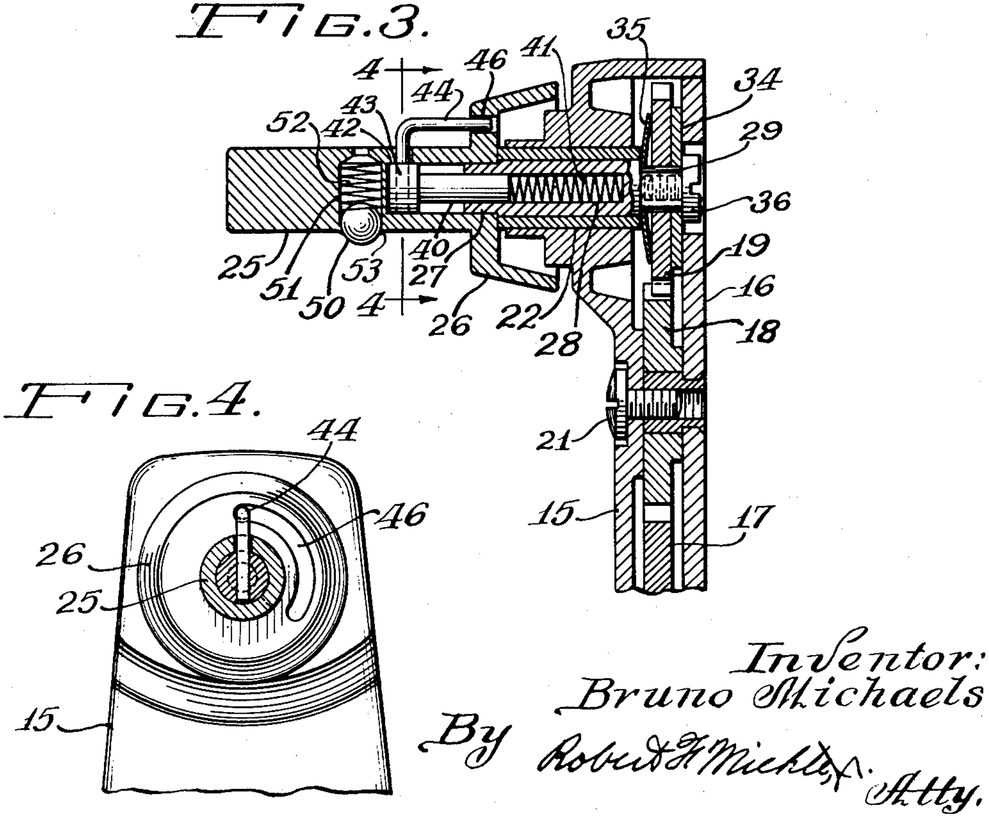
FIG. 3 is a sectional side view of the spindle taken on line 3—3 of FIG. 1.
FIG. 4 is a sectional end view taken on line 4—4 of FIG. 3.

Referring now particularly to FIG. 1, it will be observed that reference character 10 designates a projector housing to which a reel arm 15 is pivotally attached. The reel arm 15 has a back plate 16 (FIG. 3) which encloses the spindle drive gears 17, 18 and 19. Screw 21 holds the reel arm 15 and back plate 16 together. Reel arm 15 has a bushing 22 pressed therein. Spindle 25 has a reel engaging flange 26 integral therewith and a spindle shaft 27 pressed into a recess in the spindle. The spindle shaft 27 has a hollow portion 28 at one end and a section at the other end having a smaller diameter interiorly threaded at 29. The spindle shaft 27 is mounted for rotation with respect to gear 19 but is held in slipping relation with said gear 19 by means of a bronze washer 34 and a spring washer 35 frictionaly held against the gear by means of screw 36.

Figure 2:
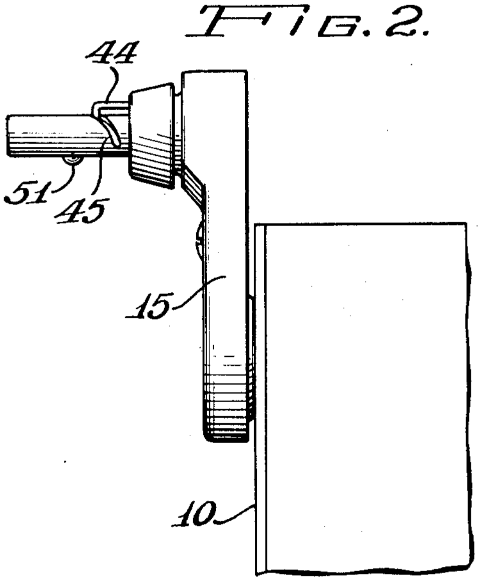
FIG. 2 is a side view of the reel arm and spindle.

A plunger 40, mounted in the hollow portion 28 of the spindle shaft 27 is biased outwardly by spring 41. The plunger 40 has a shoulder 42 at its outer end which is drilled at 43 to receive a spindle key 44. The spindle 25 has a cam slot 45 (FIG. 2) formed therein which guides the spindle key 44. This slot extends approximately one third of the way around the spindle and has a lead thereon sufficient to allow the spindle key to rotate around the spindle when a reel is pressed onto the end of the spindle. The spindle flange 26 has a slot 46 (FIG. 1) in which the unsupported end of spindle key 44 can move and yet be protected against accidental bending. The reel spindle 44 also has the conventional ball 50 in hole 51 biased outwardly by spring 52 for retaining a reel in position on the spindle.

Figure 5:
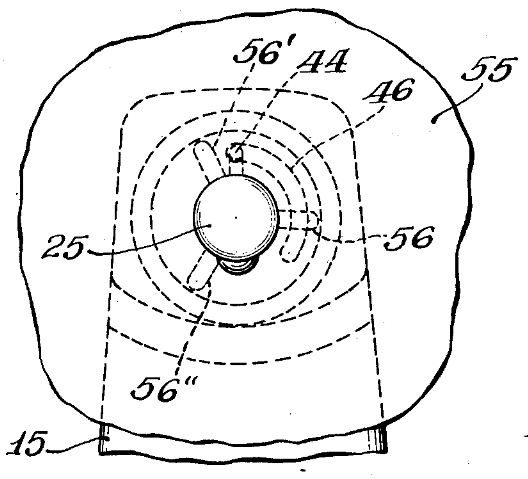
FIG. 5 is an end view of the spindle showing the spindle key and reel in an initial position.
Figure 6:
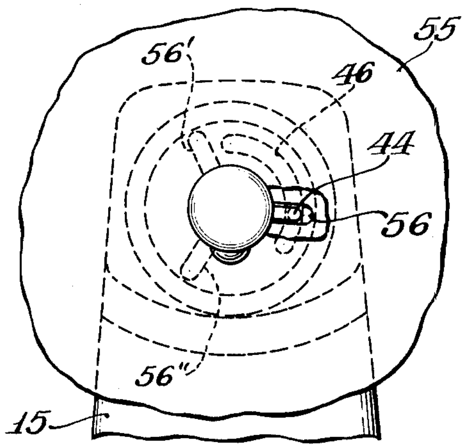
FIG. 6 is an end view of the spindle showing the spindle key and reel in a final interlocking position.

FIGS. 5 and 6 show the automatic interlocking action which takes place between the spindle key 44 and a reel hub 55 having conventional slots 56, 56', 56''. In use, the reel hub 55 is pressed directly onto the reel spindle 25 in some random fashion such as that shown in FIG. 5. The spindle key 44 is not aligned with any of the slots 56, 56', 56'' but the pressure applied to the spindle key will cause the same to rotate until it engages slot 56 in the reel hub. If a reel hub 55 should be placed on the spindle backwards, the spindle key 44 will rotate to the end of its travel but of course cannot interlock with the hub since the "wrong" side has no slots. Furthermore, since the rotation of the key 44 compresses the spring 41 the key 44 will tend to eject the reel hub from the end of the reel spindle 25 when pressure on the reel is released.

Figures 7, 8, 9, 10:
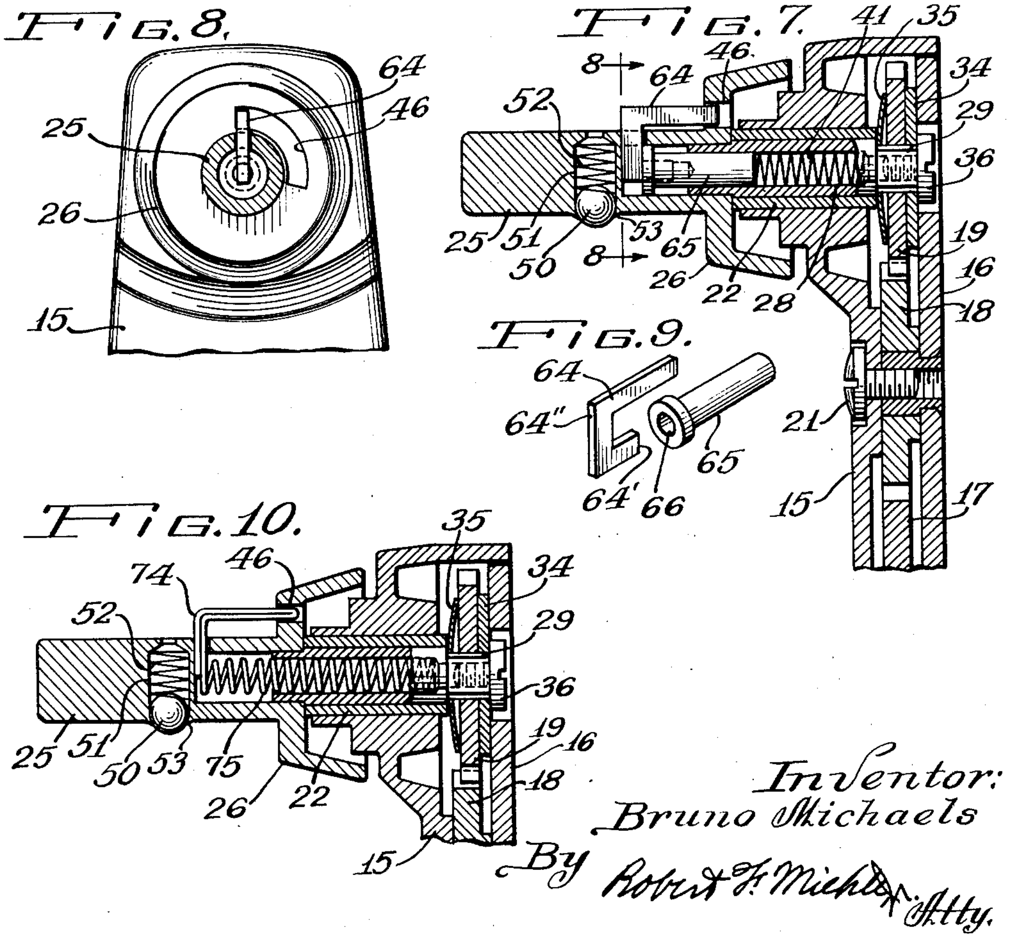
FIG. 7 is a sectional side view similar to FIG. 3 of a modification of the invention.
FIG. 8 is a sectional end view of the spindle taken on the line 8—8 of FIG. 7.
FIG. 9 is an exploded view of the spindle key and plunger shown in section in FIG. 7.
FIG. 10 is a sectional side view similar to FIG. 3 of another modification of the invention.

The modification of the invention shown in FIGS. 7, 8 and 9 differs from the showings in FIGS. 1–6 merely in the details of the spindle key 64 and the plunger 65. The spindle key 64 is made from flat stock and the end 64' force fitted into opening 66 in the end of plunger 65. End surface 64'' is flat and provides a large bearing surface for contacting a reel. This large contact surface is especially good when the use of soft plastic reels is contemplated since there would be no risk of indenting the reel with the spindle key if the reel were pushed very hard against the spindle key.

FIG. 10 shows a further modification of the invention in which the spindle key 74 is formed as an integral part of the spring biased plunger 75. This construction works in the same manner as that shown in FIGS. 1–6 and 7–9.

While the invention is thus described, it is not wished to be limited to the precise details described, as changes may be readily made without departing from the spirit of the invention.

What is claimed is:

1. In a device of the character described, the combination with a reel including two axially spaced side plates one of which has at least one slot extending radially from an axial circular opening in the center thereof, of a rotatable spindle having an axial bore therein, a cam slot in the peripheral surface of said spindle communicating with said bore, a member mounted for longitudinal movement in said bore, said member having a key projecting radially therefrom and extending through said cam slot, and resilient means in said bore for biasing said key toward one end of said cam slot.

2. A spindle having one end adapted to receive a reel having at least one slot extending radially from a center bore therein and the other end secured to a support for rotation with respect thereto, a key mounted for movement longitudinally and rotatably with respect to said spindle and adapted to interfit with said slot, and means biasing said key toward said one end of said spindle whereby a reel placed on said spindle in a position wherein said key and said slot are not in alinement will cause said key to rotate into an aligned position as the reel is moved longitudinally along said spindle.

3. A spindle as set forth in claim 2 including cam track means on said spindle for guiding said key longitudinally and rotatably with respect to said spindle.

4. A spindle as set forth in claim 3 in which the means biasing said key is a spring mounted interiorly of said spindle.

5. A spindle adapted for use with a reel having a center bore and at least one slot projecting radially from said bore, said spindle having an axial bore extending partially thereinto, a spindle shaft extending a short distance into said axial bore and in tight engagement with the walls of said axial bore, resilient means mounted in a bore in said spindle shaft, a cam slot extending through a wall of said spindle, a spindle key extending radially from the bore of said spindle and guided by said cam slot for longitudinal and rotational movement with respect to said spindle, and means in said axial bore mounting said spindle key, said resilient means biasing said mounting means and spindle key towards one end of the cam slot.

References Cited in the file of this patent

UNITED STATES PATENTS

| | | |
|---|---|---|
| 637,853 | Cowles | Nov. 28, 1899 |
| 2,537,263 | Fogle | Jan. 9, 1951 |

FOREIGN PATENTS

| | | |
|---|---|---|
| 713,997 | Germany | Nov. 19, 1941 |
| 274,808 | Great Britain | Dec. 8, 1927 |